Feb. 2, 1943. D. L. WINTERS 2,309,686
BOMBING MECHANISM FOR AIRCRAFT
Filed Sept. 8, 1941 2 Sheets-Sheet 1
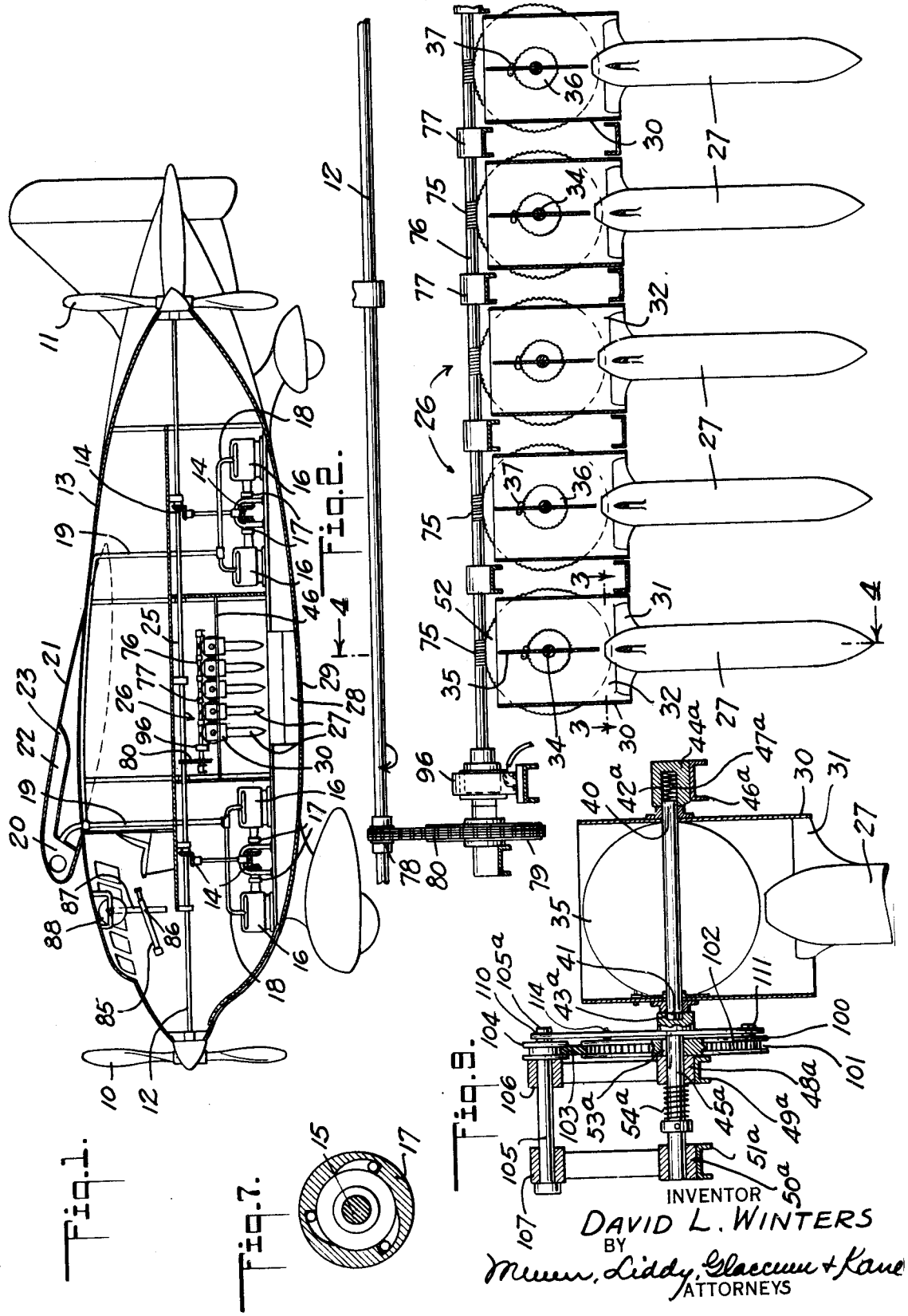
INVENTOR
DAVID L. WINTERS
BY
Munn, Liddy, Glaccum + Kane
ATTORNEYS

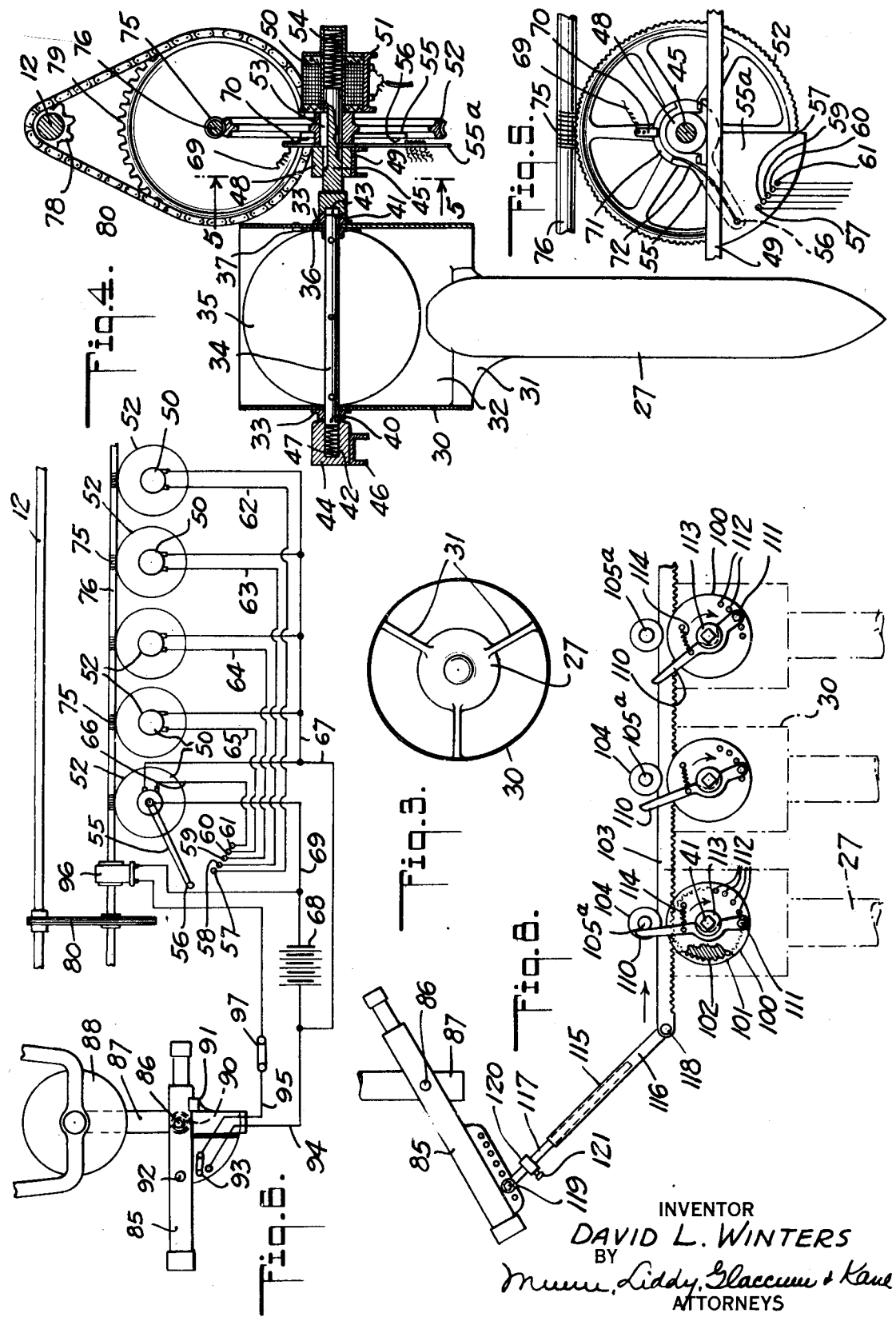

Patented Feb. 2, 1943

2,309,686

UNITED STATES PATENT OFFICE 2,309,686

BOMBING MECHANISM FOR AIRCRAFT

David L. Winters, Los Angeles, Calif.

Application September 8, 1941, Serial No. 410,003

13 Claims. (Cl. 89—1.5)

This invention relates generally to aircraft and more particularly to bombing mechanism therefor.

An object of the invention is to provide a gravity bombing mechanism embodying means by which bombs can be released automatically or manually under the control of a sighting or' aiming device and in conjunction with automatically or manually adjustable velocity reducing means for the bombs by which the horizontal component of a bomb's travel when released from the plane, is materially reduced, to promote accuracy in gravity bombing by a more nearly vertical travel of the bomb, all in such manner that by the use of the automatic adjustment and releasing feature of the invention, a single pilot can operate the aircraft, deliver a bombing attack, and simultaneously work a machine gun or cannon for attack or defense.

Another object of the invention is to provide an automatic adjusting and releasing mechanism for bombs controlled by a gyroscopically or otherwise stabilized aiming device such as a telescope, said mechanism being synchronized with the propeller shaft to effect a predetermined adjustment of the flight retarding elements of the bombs in a predetermined timed relationship to the release of the bombs, all to the end that upon sighting a target with the aiming device when the plane bears a certain definite relationship to the target when approaching the latter, the proper adjustment of such retarding elements will be made for a release of the bombs automatically in succession or simultaneously, according as it is desired to spread or bunch the bombs on the target.

A further object of the invention is to provide a heavier-than-air-craft whose aerofoil can be supplied with a heating fluid by utilizing waste heat from the power plant of the aircraft in a manner to prevent the formation of ice on the aerofoil, which would prevent the successful operation of the mechanisms above set forth.

Another object of the invention is to provide a heavier-than-air-craft whose propeller or propellers are driven by a plurality of power plants, with means co-acting with the driving mechanism between the propellers and power plants by which any one or more of the latter can cease operation without adversely affecting the continued operation of the other power plants, whereby to promote safety of operation and enable any power plant to be shut down at will for inspection or repair, or in accordance with various able power requirements for operation of the aircraft with maximum efficiency.

With these and other objects in view, the invention resides in the combinations, arrangements and functional relationships of elements as set forth in the following specification and particularly pointed out in the appended claims.

In the accompanying drawings:

Figure 1 is a vertical longitudinal sectional view of an aircraft in which one form of this invention is embodied, Figure 2 is an enlarged fragmentary sectional view of a bomb rack, and illustrating one form of adjusting and releasing mechanism embodied in the invention, Figure 3 is a detail sectional view taken on the line 3—3 of Figure 2, Figure 4 is an enlarged vertical sectional view taken on the line 4—4 of Figure 2, Figure 5 is a detail sectional view taken on the line 5—5 of Figure 4, Figure 6 is a diagrammatic view illustrating electrical circuits embodied in the invention, Figure 7 is an enlarged transverse sectional view of one of a number of overrunning clutches embodied in the invention, Figure 8 is a vertical longitudinal sectional view of a modified form of bomb adjusting and releasing mechanism embodied in the invention, Figure 9 is a fragmentary vertical sectional view similar to Figure 4, of the modified form of mechanism illustrated in Figure 8.

Referring specifically to the drawings and more particularly to Figures 1 to 7 inclusive, this form of the invention is shown associated with an aircraft of heavy load carrying capacity driven by variable pitch tractor and pusher propellers 10 and 11 on a common propeller shaft 12 extending fore and aft through the fuselage 13 and operatively connected through suitable gear trains 14 to the crankshafts 15 of power plants 16 supported in pairs in the fuselage 13 with the plants of each pair arranged in tandem, all as shown in Figure 1.

Interposed between the crankshafts 15 and gear trains 14 are suitable overrunning clutches 17 of which a typical one of the cam and roller type is shown in Figure 7, with the several clutches arranged so as to provide a positive driving connection when the power plants are driving the propeller shaft. However, should any power plant cease operation the driving connection will be disrupted by the correlated clutch so as to permit the other power plants to continue in operation. Thus, should any power plant fail, or require inspection or repair, or should the power requirements at any time be less than that delivered by all power plants, the number of power plants in operation can be reduced without adversely affecting continued operation of any one or more of the power plants, as the particular clutches involved will merely operate idly.

From the cylinder heads 18 of the power plants 16 lead heat insulated conduits 19 to a heating chamber 20 in the aerofoil 21 at the nose thereof to extend from one end of the aerofoil to the other, with ducts 22 leading rearwardly from the chamber 20 at intervals along the length of the aerofoil, and terminating in outlets 23 in the form of slots located within the zone of reduced pressure above the aerofoil created when the aircraft is in flight. Thus, it will be clear that with the power plants in operation, the waste heat therefrom will provide sufficient heat within the nose portion of the aerofoil to function as a de-icing means by preventing the formation of ice on the aerofoil, and without setting up any back pressure on the exhausts of the power plants due to the suction action of the air stream in the zone of reduced pressure in which the outlets 23 are located.

The fuselage 13 is provided with a bomb compartment 25 in which is supported a bomb rack designated generally at 26, for supporting a plurality of bombs 27, by suspending the bombs vertically in a fore and aft row immediately above a bomb discharge hatch 28 in the bottom of the fuselage, which is normally closed by a suitable cover 29.

Each bomb 27 has a co-axially arranged open ended cylinder 30 rigidly supported beyond or in trailing relation to the tail end of the bomb by a plurality of arms 31, the cylinder being of a diameter considerably larger than that of the bomb casing and defining an air passage 32.

Journaled in bearings 33 on the cylinder 30 of each bomb is a shaft 34 extending diametrically of the cylinder and transversely of the longitudinal axis of the bomb as shown in Figure 4. Fixed to the shaft 34 is a substantially balanced retarding or braking element 35 in the form of a disk of a diameter to be rotatable in the cylinder from a position parallel to the axis thereof in which the element offers its least resistance to the air flowing through the passage 32, to a position at a right angle to the cylinder axis wherein the element offers its maximum resistance to the air flow.

A suitable holding means such as a V toothed wheel 36 fixed to the shaft 34 and constantly engaged by one or more spring pressed dogs 37, co-acts with the latter to prevent shifting of the element under the pressure of air flowing through the cylinder. As also shown in Figure 4, the ends of the shaft 34 of each bomb are extended beyond the bearings 33 to provide relatively short trunnions 40 and 41 normally seating in the sockets 42 and 43 of supporting members 44 and 45 respectively, for co-action of the members in supporting the bombs vertically as shown.

The member 44 for each bomb shaft 34 is rigidly secured to a horizontal frame member 46 of the bomb rack 26, and contains in its socket 42 a spring 47 tending to urge the trunnion 40 from the socket. The member 45 for each bomb shaft 34 is mounted for rotary and axial movements in a bearing 48 rigidly secured to a common horizontal frame member 49 of the bomb rack 26. The trunnion 41 and socket 43 are complementarily non-circular to provide a rotary driving connection therebetween for angular adjustment of the retarding element 35.

The socket member 45 constitutes the core of a solenoid 50, the winding of which is rigidly secured to the common frame member 51 of the bomb rack. Confined between each bearing 48 and the respective solenoid 50 is a worm wheel 52 mounted on the member 45 and operatively connected thereto by a spline 53 so as to permit axial movement of the member and yet rotate the latter.

The socket member 45 of each bomb suspending means is urged by a spring 54 to the advanced position shown in Figure 4 wherein the member co-acts with the socket member 44 in supporting the respective shaft 34, it being noted that the spring 54 is under a greater load than the spring 47 for a purpose to be later described.

Fixed to one of the worm wheels 52 is an arm 55 of insulating material having a contact 56 adapted to successively engage stationary contacts 57, 58, 59, 60 and 61, one for each solenoid 50, and secured to a plate 55a of insulating material suitably fastened rigidly to the respective bearing 48. The contacts 57 to 61 are respectively connected by conductors 62, 63, 64, 65, and 66 to the respective solenoids 50, from which latter leads a common return conductor 67 to one side of a source of current supply such as a battery 68 all as shown in Figure 6. From the other side of the battery 68 leads a conductor 69 to a brush 70 mounted on the plate 55a and having wiping engagement with a segmental contact 71 secured on the arm 55 and connected to the contact 56 of the latter by a conductor 72 (Figure 5). Thus, it will be clear that as the arm contact 56 engages the contacts 57 to 61 in succession, the normally open circuits including the respective solenoids 50 will be completed to energize the latter for the release of the bombs 27 successively in a predetermined timed relationship as will be later more fully described.

Constantly meshing with the worm wheels 52 are worms 75 formed on a shaft 76 journaled in suitable bearings 77 and disposed below and in parallelism to the propeller shaft 12. A sprocket pinion 78 is fixed to the propeller shaft 12, and a sprocket wheel 79 is fixed to the shaft 76, for co-action with a silent chain 80 and with the worms 75 and worm wheels 52 in imparting identical rotational movements to the several shafts 34 of the braking elements 35 at an extremely slow speed in a predetermined timed relationship to the speed of the propeller shaft.

A sighting or aiming device illustrated in the present embodiment of the invention as a telescope 85, is pivotally mounted at 86 on a supporting element 87 mounted on a suitable gyroscopic stabilizing device 88 whose purpose is to maintain the support in a definite fixed position such as perpendicular irrespective of various motions of the aircraft, to the end of providing a base line from which predetermined angular movement of the telescope is calculated.

The telescope 85 is normally urged by a spring 90 into engagement with a stop 91, and is provided with a suitable lug 92 disposed to close a switch 93 on the supporting element 87 when the telescope is swung to a predetermined operative position to close a circuit including the battery 68 and conductors 94 and 95 connected to a suitable magnetic clutch 96 mounted on the shaft 76 between the sprocket wheel 79 and the worms 75, to operatively connect co-axial sections of the shaft 76 and thus drive the several worm wheels 52 from the propeller shaft 12. A suitable main switch 97 is included in circuit with the conductors 94 and 95, all as shown in Figure 6.

In operation, let it be assumed that the aircraft is in flight and is approaching a ground target preferably directly upwind, at an altitude which is being maintained substantially constant and is precalculated for the telescope 85, when trained at a predetermined angle on the target, to close the switch 93, whereby to actuate the magnetic clutch 96 and start driving the shaft 75 from the propeller shaft 12.

This operation is timed with respect to a preselected ground speed of the aircraft, so as to be effected prior to entry of the aircraft into the zone to be bombed, it being noted that the speed of rotation of the propeller shaft 12 is assumed to be maintained constant by varying the pitch of the propellers 10 and 11 as necessary to maintain a precalculated ground speed by thus compensating for a known wind velocity.

Identical adjustment of all the braking elements 35 will be initiated upon starting of the shaft 75, and the several bombs 27 will be automatically released in successive order by the closing of the solenoid circuits at the contacts 57 to 61 inclusive so as to energize the solenoids 50 in such timed relationship to the propeller shaft speed, that the amount of adjustment given to the braking elements 35 of the bombs at the instant of release of any bomb, will result in such a predetermined braking action upon the respective bomb as will retard the falling speed of the bomb the proper amount to insure accuracy in bombing the target upon which the telescope was trained at the instant that the switch 93 for the clutch 96 was closed, it being understood that by virtue of the braking elements, the horizontal component of the bomb's travel will be proportionately reduced to obtain a more nearly vertical travel of the bomb for greater accuracy in bombing.

The actual release of any one of the bombs is effected upon energizing the respective solenoid 50, which thus retracts its core formed by the member 45, against the action of the spring 54, sufficiently to clear the member 45 from the trunnion 41 and permit the lesser loaded spring 47 to shift the bomb laterally the slight amount necessary to clear the trunnion 40 from the socket 44, whereupon the bomb will instantly gravitate from its suspended position in the rack 26.

Once the telescope has been trained upon a target and closing of the clutch switch 93 effected, the adjustment of the braking elements 35 and the release of bombs is accomplished automatically, so that during these operations the pilot will be entirely free to devote himself to the craft's armament in attack or defense as the circumstances require.

Reference will now be had to Figures 8 and 9 which illustrate a manual form of adjusting and releasing means for the bombs 27, each of whose trunnions 40 and 41 are received in sockets 42a and 43a of socket members 44a and 45a, the member 44a being rigidly on the common frame member 46a of the bomb rack 26a, and containing a spring 47a for urging the trunnion 40 from the socket 42a.

The socket 45a of each bomb supporting means is mounted for rotation and axial movement in bearings 48a and 50a rigidly mounted on the common frame members 49a and 51a of the bomb rack, and is normally urged axially by a spring 54a in a direction to disengage the socket 43a from the trunnion 41.

Confined to rotate with the socket member 45a of each bomb supporting means by a key 53a, while permitting axial movement of the socket member, is a timing member 100 provided with a peripheral groove 101 the bottom of which is toothed to form a spur gear 102 with which meshes a rack bar 103 common to the members 100 of the several bomb supporting means.

To maintain the rack bar 103 constantly in mesh with the gears 102, the back of the rack bar rides in the grooves of peripherally flanged wheels 104, one for each of the members 100 and fixed to shafts 105 journaled in bearings 106 and 107 in parallelism and directly above the axis of the socket members 45a.

Holding elements 110, one for each timing member 100, and in the form of a lever, can be pivoted on stud bolts 111 adapted to be threaded in any one of an arcuate series of threaded openings 112 in the members 100, to dispose the holding elements 110 in the same or different angular positions with respect to the projecting ends 105a of the shafts 105. Such shaft ends constitute trips operable in predetermined positions of the timing members 100, to which they are adapted to be moved by the rack bar 103, to swing the holding elements 110 free of the heads 113 of the respective socket members 45a against the action of springs 114 so as to permit the respective springs 54a to act in axially shifting such socket members free of the trunnions 41, whereby to permit the springs 47a to disengage the other trunnions 40 from the respective socket members 44a, to release the bombs from the rack.

The rack bar 103 is adapted to be manually actuated to identically adjust the braking elements 35 of the bombs by imparting corresponding rotational movements to the several timing members 100, in accordance with predetermined angular movement of the telescope 85, all for the same purpose as accomplished automatically by the mechanism shown in Figures 1 to 7, inclusive.

In this form of the invention, the telescope 85 is operatively connected to the rack bar 103 by a link 115 composed of telescopically associated sections 116 and 117 pivotally connected respectively at 118 and 119 to the rack bar and telescope as shown in Figure 8. The pivotal connection 119 is adjustable to vary the lever arm between such connection and the pivotal mounting 86 of the telescope on the stabilized support 87, and an operating collar 120 is adjustably secured by a screw 121 on the section 117 of the link 115 for engagement with the other section 116 to initiate movement of the rack bar 103 when the telescope is trained on a target at a predetermined sighting angle which may correspond to the angle of the telescope at which the magnetic clutch 96 is energized as previously described.

From the foregoing description it will be manifest that the two forms of the invention can be readily modified one by the other, by driving the timing members 100 from the propeller shaft 12 rather than by the manually operated rack, in order to obtain an automatic adjustment and release of the bombs mechanically, and that the target sighting movement of the telescope can be utilized as a source of manual power to directly operate the mechanism or only as a control means to initiate automatic operation of the mechanism.

Furthermore, it will be evident that the mechanical releases shown in Figures 8 and 9, and the electrical releases shown in Figures 4, 5 and 6 can be substituted one for the other in accordance with the requirements of various types of aircraft and different conditions met in practice.

In conclusion, it will be understood that to obtain precision bombing automatically or manually in the manner described, it is necessary to maintain the ground speed in a fixed relation to the propeller speed. It is therefore essential to not only prevent the formation of ice on the wings of the craft, which would destroy this relation, but is also essential to change the pitch of the propellers to compensate for changes in wind or drift, without changing the speed of the propeller shaft.

I claim:

1. In an aircraft, in combination, a bomb support on the aircraft; a bomb having adjustable means for reducing the horizontal component of its fall when the bomb is released from the support during flight of the aircraft; a sighting device on the aircraft; means operable in synchronism with the propeller of the aircraft, to effect a predetermined adjustment of the first said means by increasingly varying its fall retarding effect upon the bomb upon training said sighting device on a target at a predetermined sighting angle; and means for releasing the bomb.

2. In an aircraft, in combination a bomb support on the aircraft; a bomb having adjustable means for reducing the horizontal component of its fall when the bomb is released from the support during flight of the aircraft; a sighting device on the aircraft; means operable in synchronism with the propeller of the aircraft, to effect a predetermined adjustment of the first means by increasingly varying its fall retarding effect upon the bomb upon training said sighting device on a target at a predetermined sighting angle; and means operable in synchronism with the last said means to release the bomb.

3. In an aircraft, in combination, means for releasably supporting the bomb on the aircraft; a bomb having adjustable means for retarding its fall when released from the support during flight of the aircraft; a sighting device on the aircraft; means responsive to training said device on a target at a predetermined sighting angle, to effect adjustment of said retarding means in synchronism with the speed of the aircraft's propeller, by progressively increasing the fall retarding action of such means; means for releasing the bomb; and means for locking the retarding means upon release of the bomb.

4. In an aircraft, in combination, means for releasably supporting a plurality of bombs on the aircraft; bombs, each having adjustable means for retarding its falling speed when released from the support during flight of the aircraft; a sighting device on the aircraft; means operable in synchronism with the propeller of the aircraft, to effect identical adjustment of the retarding means of the bombs; means by which training of the sighting device on a target at a predetermined sighting angle will initiate adjustment of the retarding means; and means for releasing the bombs in timed relationship to adjustment of said retarding means.

5. In an aircraft, in combination, bomb supporting means thereon; a bomb having adjustable means for retarding its fall when released from the support during flight; means by which progressively increasing fall retarding adjustment of the second said means can be effected; means including a target sighting device, and operatively associated with the last said means, to render same active in adjusting said adjustable means; and means for releasing the bomb.

6. In an aircraft, in combination, a bomb having adjustable means for retarding its falling speed; means for releasably supporting the bomb on the aircraft; means for releasing the bomb from the supporting means; means by which the first means can be adjusted to obtain a predetermined fall-retarding action therefrom at the instant that the bomb is released; and a target sighting device on the aircraft for controlling said adjusting and releasing means.

7. In an aircraft, in combination, a bomb having adjustable means for retarding its falling speed; means for releasably supporting the bomb on the aircraft; means for releasing the bomb from the supporting means; means by which the first means can be adjusted to obtain a predetermined fall-retarding action therefrom at the instant that the bomb is released; a target sighting device on the aircraft; means by which target sighting movement of said device will effect a predetermined adjustment of said retarding means; and means by which the release of the bomb will be effected in response to a predetermined adjustment of the retarding means.

8. In bombing mechanism, in combination, a bomb having a pivoted speed retarding element; two means co-acting to releasably sustain said bomb; one of said two means being operatively connected to said retarding element to effect pivotal adjustment of the latter; and means by which the bomb can be released from said two means.

9. In bombing mechanism, in combination, a bomb having a speed retarding element; a shaft pivoted on the bomb and supporting said element for pivotal adjustment to vary its retarding action; a pair of supporting members co-acting with said shaft to releasably suspend the bomb; one of said supporting members being rotatably mounted to adjust said retarding element and being axially movable to release said shaft; means for axially moving said shaft as aforestated; and means for releasing said shaft from the other supporting member.

10. In bombing mechanism, in combination, a bomb having a speed retarding element; a shaft pivoted on the bomb and supporting said element for pivotal adjustment to vary its retarding action; a pair of supporting members co-acting with said shaft to releasably suspend the bomb; one of said supporting members being rotatably mounted to adjust said retarding element and being axially movable to release said shaft; means urging said one of the supporting members axially to shaft-supporting position; and a solenoid operatively connected to said one of the supporting members for operation when energized, in releasing such member from said shaft against the action of said urging means.

11. In bombing mechanism for aircraft, a plurality of bombs, each having a speed retarding element and a pivotally mounted shaft by which the element is mounted on the respective bomb for adjustment to vary the speed retarding effect of the element; a pair of supporting members for each of the shafts co-actable therewith to suspend the respective bomb; one supporting member of each pair being operatively connected to the respective shaft to rotate the latter, and being axially movable to release the shaft; means operatively connected to said one of each pair of supporting members for driving the latter to effect adjustment of the retarding elements; and means for releasing said shafts from the pairs of supporting members when the retarding elements have been adjusted to different predetermined retarding positions.

12. In bombing mechanism for aircraft, a plurality of bombs, each having a speed retarding element and a pivotally mounted shaft by which the element is mounted on the respective bomb for adjustment to vary the speed retarding effect of the element; a pair of supporting members for each of the shafts co-actable therewith to suspend the respective bomb; one supporting member of each pair being operatively connected to the respective shaft to rotate the latter, and being axially movable to release the shaft; a common shaft operatively connected to said one of each pair of supporting members for driving the latter to effect adjustment of the retarding elements; means for releasing said shafts from the pairs of supporting members and including solenoids operatively connected to said one of the pairs of supporting members to move the latter to shaft releasing position when the solenoids are energized; and means for energizing the solenoids in successive order.

13. In bombing mechanism for aircraft, a plurality of bombs, each having a speed retarding element and a pivotally mounted shaft by which the element is mounted on the respective bomb for adjustment to vary the speed retarding effect of the element; a pair of supporting members for each of the shafts co-actable therewith to suspend the respective bomb; one supporting member of each pair being operatively connected to the respective shaft to rotate the latter, and being axially movable to release the shaft; geared timing members operatively connected to said one of each of the pairs of supporting members for driving same to effect adjustment of the retarding elements; a rack bar meshing with said timing members and adapted for racking movement by a target sighting device; holding elements mounted on the timing members and co-actable respectively with the said one of each pair of supporting members, to maintain the latter in shaft supporting position; means operable in response to a predetermined adjustment of the retarding elements to release the holding elements; and means co-acting with the supporting members to release same from the respective shafts when the holding elements are released as aforestated.

DAVID L. WINTERS.